United States Patent
Leemet et al.

(10) Patent No.: US 10,482,277 B2
(45) Date of Patent: *Nov. 19, 2019

(54) SECURITY APPLICATION FOR DATA SECURITY FORMATTING, TAGGING AND CONTROL

(71) Applicants: Jaan Leemet, Aventura, FL (US); Paul Schmidt, Rocky Hill, CT (US)

(72) Inventors: Jaan Leemet, Aventura, FL (US); Paul Schmidt, Rocky Hill, CT (US)

(73) Assignee: Tangoe US, Inc., Shelton, CT (US)

( * ) Notice: Subject to any disclaimer, the term of this patent is extended or adjusted under 35 U.S.C. 154(b) by 145 days.

This patent is subject to a terminal disclaimer.

(21) Appl. No.: 15/712,700

(22) Filed: Sep. 22, 2017

(65) Prior Publication Data

US 2018/0012036 A1    Jan. 11, 2018

Related U.S. Application Data (63) Continuation of application No. 14/864,420, filed on Sep. 24, 2015, now Pat. No. 9,773,121.

(51) Int. Cl.
*G06F 21/00* (2013.01)
*G06F 21/62* (2013.01)
*G06F 16/11* (2019.01)
*G06F 21/80* (2013.01)

(52) U.S. Cl.
CPC ........ *G06F 21/6218* (2013.01); *G06F 16/116* (2019.01); *G06F 21/6227* (2013.01); *G06F 21/80* (2013.01)

(58) Field of Classification Search
CPC .................................................. G06F 21/6218

USPC ............................................................ 726/1
See application file for complete search history.

(56) References Cited

U.S. PATENT DOCUMENTS

| | | | |
|---|---|---|---|
| 6,381,632 | B1 | 4/2002 | Lowell |
| 6,795,856 | B1 | 9/2004 | Bunch |
| 7,012,529 | B2 | 3/2006 | Sajkowsky |
| 7,222,293 | B1 | 5/2007 | Zapiec et al. |
| 7,584,227 | B2 | 9/2009 | Gokhale et al. |

(Continued)

FOREIGN PATENT DOCUMENTS

WO    2010099560 A1    9/2010

OTHER PUBLICATIONS

U.S. Appl. No. 14/263,756 Title: Cost Allocation for Derived Data Usage Inventors: Jaan Leemet, Paul Schmidt, Albert R. Subbloie, Jr., and Christopher J. DeBenedictis.

(Continued)

*Primary Examiner* — Longbit Chai
(74) *Attorney, Agent, or Firm* — St. Onge Steward Johnston & Reens, LLC (57) ABSTRACT

A security program installed or in communication with a computer is provided. The security program is configured to intercept disk (I/O) operations that read/write from/to disk. This allows the security program to confirm and control access to data based on security rules. Further, the security program can categorize data based on security rules and then format and store data on disk in a format that prevents access by application(s) of the computer. The security program is further configured to re-format data to be accessible by the application in a format accessible by the application(s) when a request to access the data complies with security rules.

15 Claims, 4 Drawing Sheets

(56) References Cited

U.S. PATENT DOCUMENTS

| | | | |
|---|---|---|---|
| 7,743,069 B2 * | 6/2010 | Chitkara | G06F 21/6227 707/781 |
| 7,877,362 B2 | 1/2011 | Gokhale et al. | |
| 8,166,554 B2 | 4/2012 | John | |
| 8,925,036 B2 | 12/2014 | Pramod | |
| 2008/0244061 A1 | 10/2008 | Kime | |
| 2009/0094679 A1 | 4/2009 | Canning et al. | |
| 2009/0203352 A1 | 8/2009 | Fordon et al. | |
| 2012/0226808 A1 | 9/2012 | Morgan | |
| 2014/0059056 A1 | 2/2014 | Chaney et al. | |
| 2014/0201850 A1 | 7/2014 | Garcia et al. | |
| 2014/0279454 A1 | 9/2014 | Raman et al. | |

OTHER PUBLICATIONS

U.S. Appl. No. 14/263,772 Title: Data Usage Analysis and Reporting Inventors: Jaan Leemet, Paul Schmidt, Albert R. Subbloie, Jr., and Christopher J. DeBenedictis.

* cited by examiner

SECURITY APPLICATION FOR DATA SECURITY FORMATTING, TAGGING AND CONTROL

FIELD OF THE INVENTION

The present invention relates to methods and systems for providing enhanced security to data access. More particularly, the present invention relates to controlling access to data based on the sensitivity and content of the data.

BACKGROUND OF THE INVENTION

The control of sensitive information has been a concern of businesses for many years, including pre-internet and computers. The control of sensitive information has been made more difficult by the ability to access data via the internet and the advent of e-mail which allows for transmission of potentially sensitive data.

Although it is desirable to control access to data, it is also desirable that the access controls do not restrict productivity and authorized use of the data.

Some solutions to the data access problem include encryption of storages. This system uses encryption keys that allow for a storage to be decrypted so that the data records thereon can be accessed, viewed and edited. This solution is a relatively binary operation that may not work for network based systems, for example, access is either allowed to everything or denied for all.

Further, while encryption and access controls are interesting and valuable, the system that manages and or annotates the content for various access levels has traditionally been distinct from the data itself. By placing the wrapper of annotation and control data around the objects being managed themselves allows the data to move portably across systems and have adaptors that can understand these annotations and controls at each access point (to read, modify, write, delete etc.)

In some cases, it is desirable to allow certain employees to access data records based on their job, working group, project assignment and other criteria. At the same time, it may be desired to deny access to certain data records. Traditional encryption systems provide access to the decrypted storage, and it becomes very difficult if not impossible to keep track of what is on each storage and who should have access to the data records. Further, as data records are edited security concerns for particular records may change. For example, if a report is opened in Word® and sensitive information is added, the sensitivity and therefore the security protocols should change.

There are also problems surrounding transmission of the data records to other parties or other computers that may not be controlled by the enterprise which may include an employee's personal (home) computer/laptop. Although many enterprises may encourage employees to work remotely, if/when an employee leaves the enterprise, the data of the enterprise should not follow the employee to their new job. The traditional solution to this problem is to prevent transmission of data records all together or to require encryption of data records and specific decryption codes for each on non-enterprise computers. Tracking codes or preventing transmission becomes obstructive and makes it difficult for the employee to work remotely.

With the proliferation of networked devices, it is desirable to provide a system that allows for secure access to data without interrupting employee workflow.

Current methods of solving the security issues may be generally effective from a security standpoint, but in practice, there is a significant interruption in employee workflow. Consider secure electronic storage facilities or computers that are not connected to the internet. These systems may allow a user access to certain sensitive data in secure locations that are locked and use access keys or scanners to determine or verify the identity of a user and verify that the user is allowed to access certain storage locations. For example, imagine a company's most sensitive data being stored in a bank vault that may only be accessed by certain individuals. If such individual needs access to the sensitive information to do certain tasks on behalf of the company, the employee would need to walk down to the vault, open the computer, access the data. The issue then becomes one of whether the employee can transport the data out of the secure location, for example, with a flash drive. If the employee can transport data out on a flash drive, the security measures may require encryption or use of keys to actually be able to use the data. Once decrypted, another issue is that the data is now accessible in a decrypted format and it may be possible to copy the sensitive data to an uncontrolled storage.

As the prevalence of computing devices in businesses becomes greater and greater, data usage and transfer is rapidly increasing. Employees are given access to company data through numerous connections such as cloud logins, VPN connections, email and others whether through company devices or BYOD/BYOC devices. Much of this data is sensitive to the company and data breaches can cost companies a significant competitive advantage. In addition, numerous cloud storage, synchronization and backup systems make selective removal of sensitive data difficult.

There are a host of security concerns associated with this increased usage and access to company data. Many industries rely on proprietary data such as market research, statistics, product information, test results, pricing, contacts and numerous other categories of data. In addition, data analytics is increasingly becoming an important industry alone, and maintaining control over data access and proliferation is important to a data analytics business which relies on providing insight and recommendations through data analysis and/or reporting.

At the same time, many employees require access to sensitive data in order to perform day to day job functions. Therefore, although controls are desirable, valid access and use for authorized persons is necessary to allow employees to maintain an efficient workflow and to complete project tasks.

In addition, inadvertent disclosure of data can lead to liability, such as professional or contractual liability, therefore it is important that data security controls guard against inadvertent or unauthorized disclosure in order to avoid this liability.

Systems have been disclosed relating to Data Usage Analysis and Reporting (U.S. patent application Ser. No. 14/263,772) and Cost Allocation for Derived Data Usage (U.S. patent application Ser. No. 14/263,756). The content of these two applications is incorporated by reference herein. These applications disclose systems that identify data usage on a granular level to generate data transactions. These data transactions are then used in the generation of reports based on the data usage of the device, for example reports may allow for cost allocation of the data usage based on, the source or destination associated with data usage. These data transactions allow for a granular view of information which could include the purpose, content, source, destination or other information.

An enterprise may have shared network drives that are accessible from computers on a local network via user login. Such a system may allow the user full access to data stored on the network drives based on login controls at the initial access point (i.e. logging into a computer). Proper security management of data access in many cases cannot be adequately implemented based on the initial access point, because once an authorized login or password is used, data may often be saved and moved out of a protected environment. For example, if an employee has document(s) they are working on at an enterprise location that they would like to continue working on from home, they will often e-mail the document(s) to themselves and then save a local copy on a local machine. Although the employee was required to login to a computer system or company controlled database, the ability to email a document to themselves and then save a local copy makes it nearly impossible for the company to remove access to the local data copy when the employee leaves. This is even more problematic when the employee leaves for a competitor as the locally stored data may provide the competitor with an proprietary information.

In the initial access point security case, the employer is essentially relying on their employees to comply with security guidelines and not save data in unsecure locations. This system allows for a wide array of human errors and inappropriate uses of sensitive data even though the employer may be able to determine who accessed and transmitted the data.

Identification of data types, categories and content on various enterprise connected devices can allow the enterprise to better control access and proliferation of company data and to make sure appropriate security protocols are complied with.

Although one could theoretically implement controls that would prevent the practice of allowing logged in users to e-mail documents to themselves, this type of relatively binary control may have the undesired effect of making employees unable to work remotely. Many enterprises may encourage access over a VPN connection to allow for remote access and working, however sometimes an internet connection is not available, or working through a VPN connection and remote access application may be cumbersome and slow such that local storage and access to sensitive data is more efficient for the employee.

In addition, document(s) may contain data that is not extremely sensitive based on the content of the documents(s), the project or other. Accordingly, data security controls are less important as the sensitivity of the data decreases. However, many security protocols restrict access on a device by device or storage location by storage location protocol, and these data security protocols are sometimes insufficient to identify what data is flowing where and restrict certain actions or events based on the content or category of data.

Therefore, it is desirable to apply enhanced data security protocols based on the content, purpose or category of data, data access and/or data transmission where the security protocols allow adequate security controls to be implemented without overly restricting user productivity and access to the data when such access is proper.

The sensitivity of the data may also adjust over time based on the context. An exercise of research may start off be relatively low sensitivity but may lead to an NDA based effort (higher sensitivity) and further evolve into merger and acquisition activity (high sensitivity). It is important to note that even if the document has not changed, the documents relating to these efforts my evolve with the security context. In this case, the reading program that accesses the document would reassess the sensitivity level based on a dynamic set of rules and would adjust accordingly before presenting the user with the data contained within.

SUMMARY OF THE INVENTION

It is therefore an object of the present invention to provide a system and method for controlling transmission of sensitive data based on content and security rules to prevent or at least reduce the likelihood of unauthorized access to the sensitive data It is further an object of the present invention to provide a system and method for controlling transmission of sensitive data to allow for transmission to trusted external computers or remote storages.

It is further an object of the present invention to provide a system and method for controlling access to sensitive data on external computers and remote storages to allow for secure access to the sensitive data and to control transmission thereof.

The term "network" as used herein includes both networks and internetworks of all kinds, including the Internet, and is not limited to any particular network or inter-network.

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The terms "first" and "second" are used to distinguish one element, set, data, object or thing from another, and are not used to designate relative position or arrangement in time.

The term "disk input and output operation(s)" or "disk (I/O) operation(s)" shall mean a function performed between a computer (or application executing thereon) and a storage to call up a data record from memory to RAM (Random Access Memory) or to write a data record to memory (or overwrite/update a data record). It is understood that the term "disk" includes but is not specifically a physical disk, i.e. a traditional rotating hard-drive in that the term "disk" may extend to solid state drives, network accessible storages and other types of storages that are configured to store data such that such data can be called up to RAM.

These and other objects of the invention are achieved by providing a security program installed or in communication with computing devices of the system. The security program is configured to intercept disk (I/O) operations that read/write from/to disk (e.g., storage). This allows the security program to confirm and control access to data based on security rules. Further, the security program can categorize data based on security rules and then format and store data on disk in a format that prevents access by application(s) of the computer. The security program is further configured to re-format data to be accessible by the application in a format accessible by the application(s) when a request to access the data complies with security rules. As an example, Microsoft Word® utilizes files in either of .doc or .docx format, both of which could be considered a format accessible by the application.

In one aspect a system is provided for formatting data records based on security rules. A computer and a storage accessible by the computer are provided. The storage has a data record stored thereon in a first format, the first format associated with an application. A security application executes on the computer and intercepts disk input and output (I/O) operations between the computer and the storage. The security application determines a content of the data record based on one or more of: a keyword, a user identifier and a device identifier. The security application tags the data record with a tag based on the identification of the content and based on a security rule. The security rule is indicative of permissions or restrictions or combinations thereof associated with access to the data record based on the content. The security application further converts the data record to a second format and when the data record is in the second format, the data record is not accessible by the application. The data record is stored on the storage in the second format such that when the security application intercepts a disk operation to access the data record via the application, the security application compares the tag to the security rule and converts the data record to the first format if the disk operation complies with the security rule based on the tag.

The tag may be accessible from a header or meta-data of the data record when the data record is in the second format. The security application may prevent transmission of the data record over a network. In some cases, when the disk operation complies with the security rule and the data record is to the first format, the data record is available in the first format from a Random Access Memory of the computer. The first format may be selected from the group consisting of: .doc, .xls, .docx, .xlsx, .pdf, .jpg, .jpeg, .tiff, and .png. In some examples, the second format is an encryption.

The security rule may be associated with at least one user such that the permission, restriction or combination thereof applies to the at least one user. The permission or restriction may be based on a keyword associated with the data record.

In other aspects a system is provided for converting data to a first format for secure access to the data. A computer and a storage accessible by the computer are provided. The storage has a data record stored thereon in a second format such that when the data record is in the second format, the data record is not accessible by an application associated with the computer. A security application executes on the computer and intercepts disk input and output (I/O) operations between the computer and the storage. The security application further intercepts a disk operation to access the data record via the application. The security application compares a tag of the data record to a security rule and further converts the data record to the first format if the disk operation complies with the security rule based on the tag.

In some aspects the tag is accessible from meta-data or a header of the data record when the data record is in the second format. The data record may be accessible in the first format from a Random Access Memory of the computer. The first format may be selected from the group consisting of: .doc, .xls, .docx, .xlsx, .pdf, .jpg, .jpeg, .tiff, and .png. The second format may be an an encryption.

The security rule may be associated with a user such that a permission, restriction or combination thereof applies to the user.

The tag may be indicative of a keyword, a user identifier, a device identifier or combinations thereof of the data record.

In some aspects the security application intercepts a second disk operation to save the data record and the security application determines a content of the data record based on one or more of: a keyword, a user identifier and a device identifier. The security application further tags the data record with a second tag based on the identification of the content and based on a security rule, the security rule indicative of permissions or restrictions or combinations thereof associated with access to the data record based on the content. The security application converts the data record to the second format.

When the data record is accessible in the first format via the application, user interface functions which allow capture or copying of at least part of the data record may be restricted from access to the data record.

In other aspects a computer implemented method for accessing secure data by converting data to a first format is provided. The method includes one or more of the steps including: intercepting a disk input or output (I/O) operation via a security application, the disk (I/O) operation to access a data record stored in a second format on a storage, the second format preventing access to the data record by an application executing on the computer; comparing a tag associated with the data record to at least one security rule via the security application, the at least one security rule indicative of a permission, a restriction or a combination thereof associated with access to the data record; and converting the data record, via the security application, to the first format if the disk (I/O) operation complies with the at least one security rule and making the data record accessible via the application from a random access memory of the computer.

The method may include: intercepting a second disk (I/O) operation to save the data record to the storage; associating a tag with the data record based on the content of the data record and the at least one security rule; and converting the data record to the second format. Additionally storage to memory or swap space from memory would also be captured and intercepted In other aspects a computer implemented method of formatting data records based on security rules is provided, the method includes one or more of the steps of: providing a data record stored on a storage in a first format such that when the data record is in the first format it is accessible by an application associated with the computer; providing a security application executing on the computer, the security application intercepting disk input and output (I/O) operations between the computer and the storage; determining, via the security application, at least a first tag associated with the data record based on a content of the data record wherein the content is indicative of a keyword, a user identifier, a device identifier or a combination thereof; comparing, the at least the tag to a security rule via the security application, the security rule indicative of, a permission, a restriction or a combination thereof, associated with access to the data record; converting the data record to a second format via the security application, the second format preventing access to said data record by the application; and storing the data record on the storage in the second format such that any disk (I/O) operation to access the data record is intercepted by the security application.

Other objects of the invention and its particular features and advantages will become more apparent from consideration of the following drawings, claims and accompanying detailed description.

DETAILED DESCRIPTION OF THE INVENTION

Referring now to the drawings, wherein like reference numerals designate corresponding structure throughout the views, the following examples are presented to further illustrate and explain the present invention and should not be taken as limiting in any regard.

Figure 1:
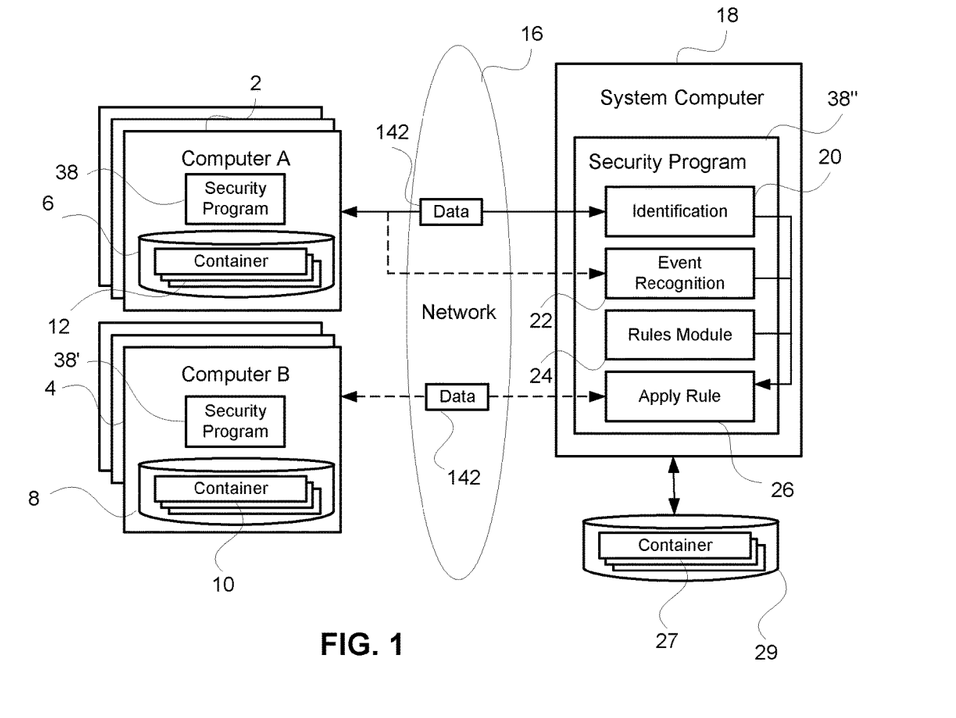
FIG. 1 is a functional block diagram showing how data access, transmission and receipt is controlled.

In FIG. 1, Computer A 2 and computer B 4 are connected to a system computer 18 via a network 16. Each computer has a storage 6/8 having a plurality of containers 12/10 thereon. The containers are structured based on security protocols as defined by security rules 24 and contain data 142 which is in a second format. The data 142 may further include tags that are associated with the security rules 24 or various permissions and/or restrictions associated with access to the data 142. The second format is a format that prevents access by applications on the respective computers. For example, the second format may be a form of encryption which cannot be read by an application. As one example, the application may be Microsoft® Word or another application that can read ".doc" ".docx" or other document files. Other applications are contemplated. Although the application may be able to display the data 142 when the data is from a second format, the content of the data 142 would be scrambled in a way that the content 142 cannot be known.

Computers A and B and the system computer are all shown with a security program 38, 38' 38" executing thereon. A specific embodiment of the security program is shown with regards to the system computer and it is understood that the security program 38, 38' can be the same as security program 38". The security program intercepts disk operations by applications that request access to particular data records. The security program further controls access and formats data to implement these controls. For example, typical disk read requests would access disk and make the particular data accessible from Random Access Memory (RAM) of the computer such that the data can be viewed/displayed and/or edited. Data is typically stored in the native application format or another format that can be accessed or read by different applications associated with the particular computer. As one example, Microsoft Word documents are typically stored in .doc or .docx.

The system herein is configured such that data is stored on disk in a second format that restricts access to the data. For example, in one embodiment, the second format is a form of encryption. The data is associated with the containers shown in FIG. 1 or there are tags associated with the data that allow for that data to be categorized and identified by the security program. When a request is made to read disk, the security program compares the request to security rules to determine if the request complies with the rules. Assuming the request does comply, the security program formats the requested data into a first format and makes the data available in the first format from RAM.

The security program also acts to categorize and containerize data stored on disk based on the security rules. For example, when initially implemented, data stored on disk may all be in formats accessible by particular applications. Content and other identifiers the data needs to be determined such that applicable security rules can be determined and the data can be associated with containers or associated with particular tags or both. The data is then formatted to the second format such that access must be made through the security program since disk operations all flow through this security program.

Once data is open in the application, the user may edit it, and these edits may cause the identifiers, tags or content to change in view of the security rules. Therefore, when a disk write request is performed, for example saving a document, the security program will intercept this request and scan the data to determine if the content, tags or other identifiers should be updated based on security rules. The security program then formats the data to the second format to control access.

A user may have a document open and may select "Save" but not close the document. Since the user is only saving progress, the system may format the newly saved version to replace the old version on disk and the data may still be accessible from RAM in the first format such that the user can continue to work on the document.

In some cases, system storage 29 can have containers 27 with data 142 associated therewith. In many cases, the data 142 may be a data record 14. It is also understood that data 142 or data records 14 may be stored on a remote or cloud storage. The remote or cloud storage may also have containers thereon that are structured based on security rules.

Although FIG. 1 shows rules module 24 on system computer 18 thereon, it is understood that a rules module and security rules can on or accessible by computer 2/4.

In order to access the data 142 from a remote or local storage a first example, computer A 2 may initiate a transfer of data or a request to transfer data to computer B 4 (e-mail for example). In this case, the user of computer A 2 would select the data 142 or data record 14 located in the container 12 to be sent. This data would be transmitted over the network to the system computer (e-mail server for example) which may identify 20 the content of the data 142 based on a tag associated with the data 142. In some aspects a security application on computer A 2 would identify 20 the content of the data 142 based on the tag. In some cases, the identification is accomplished by reading a data header 140 associated with a data record 14. The request is further analyzed to determine an event, for example, person A wishes to send document 1 to person B. This event would be compared to the rules 24 and the identification 20 based on the security permissions of person A and B as well as the content of document 1. The rule 24 is then applied 26, and assuming person B is authorized to view document 1, the data 142 or data record 14 would be sent to computer B and may be stored in the container 10 of computer B. The rules 24 may be associated with one or more characteristics and/or event conditions which are compared to the data or data record.

It is also understood that the system may simply allow data in the second format (which may be encryption) to be sent to different computers since it would be understood that the data 142 in the second format would be more or less useless unless the computer accessing the data 142 is able to re-format from the second format to the first format. Therefore, the rules module may simply verify that the data 142 that is being sent is in fact in the second format. Assuming the data is in this second format, the rule may allow sending. In some cases, the rule may only allow sending to computers or users who are known to have access to the security program 38.

Figure 2:
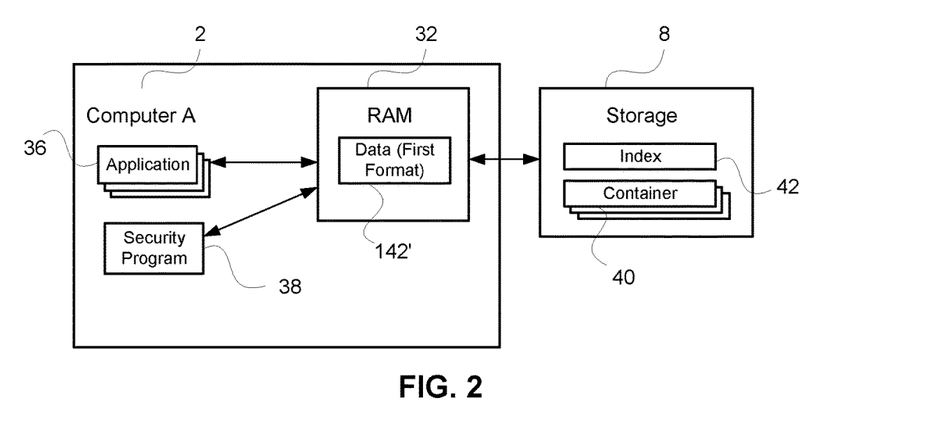
FIG. 2 is a functional block diagram showing how the access to the local data on the computers of FIG. 1 is controlled.

Referring to FIG. 2, Computer A 2 has the security program 38 and one more applications 36 executing thereon. The application may be any type of software programs that reads or accesses data on the computer A (or storage thereof) or remote data accessible by computer A (or storage thereof). Some examples of applications include Microsoft Word, Excel, Powerpoint, Visio and others. Other applications include Computer Aided Design (CAD) software such as Autodesk, Solidworks, E-drawings and the like. These are just examples of some specific applications and not limiting. Each application may have a number of file formats associated therewith. For example, Microsoft Word can open .doc, .docx, .txt, .rtf and a number of other file formats. These formats may be considered examples of the first format. It is understood that the first format would depend on the data file, the application type and the file formats that are compatible with the particular application.

The second format prevents access by the application certain data records such that if the application attempts to open, display, view, edit or perform other operations where the content of the file is accessible, the application would display either nothing or the display would look like a corrupted or otherwise un-usable or non-legible grouping of symbols. The second format may be an encrypted version of the associated file. In some cases, the second format may adjust the file extension to be .doc.second and the second format would modify the data associated with the file relative to the first format so that the application cannot view/display/open/modify or otherwise access the file. Since the file is stored as .doc.second, the security application 38 would be able to recognize that the file was originally a word document and that when requests to access the file comply with the security rules, the application 38 would be able to format the file for access.

In one example, a user of computer A 2 request access to the data 142 which is stored in the second format. The security program 38 determines if the request is permitted. For example, the particular user logged into the computer A 2 may be associated with particular projects, access levels and other data that determines the security clearance of the person accessing the data. In some cases, scanning devices or access identifiers are used to verify the identity of the user. Assuming the request to access the data 142 complies with the security rule, the security program 38 formats the data to be in the first format 142' and makes the data 142' accessible from a Random Access Memory 32 while the application is using the data 142'.

It is understood that the data 142 may be accessible from storage 8 and content identifier or security rules may be associated with the data 142 based on a header, meta-data, container 40 or other information or associations relating to the data 142. The storage 8 may also be a remote/network accessible storage. In some instances, an index 42 is used to associate data 142 with the appropriate first format. Although one example second format is .doc.second, the second format may just be .second and the index may associate the particular data 142 with the appropriate first format. This index may not be accessible by the computer A 2, application 36 or security program 38 until it is determined that the request to access the data 142 is permitted by the security rules. Once the request is verified, the index may become accessible such that the appropriate first format is associated with the particular data 142 that is being accessed such that the data in the first format 142 can be available in the correct first format. By separating the correct first format from the secure format, and additional layer of security may be provided. Although FIG. 2. shows a specific example with respect to Computer A 2, it is understood that the same or similar examples may apply to other computers that access data such as Computer B 4 or System Computer 18. It is understood that the ".second" file extension is used as an example only and other file extensions may be used for the second format. The data may also retain its original extension (".doc" etc.) and be encrypted or otherwise scrambled in a way that prevents or restricts access to the data.

In another example, computer A may request to access data on system storage 29. In this case, the identification 20 and event recognition 22 would be compared to the rule 24 to determine if computer A (or its user) is authorized to access the requested data. It is understood that the same process can be completed for cloud storage.

Figure 3:
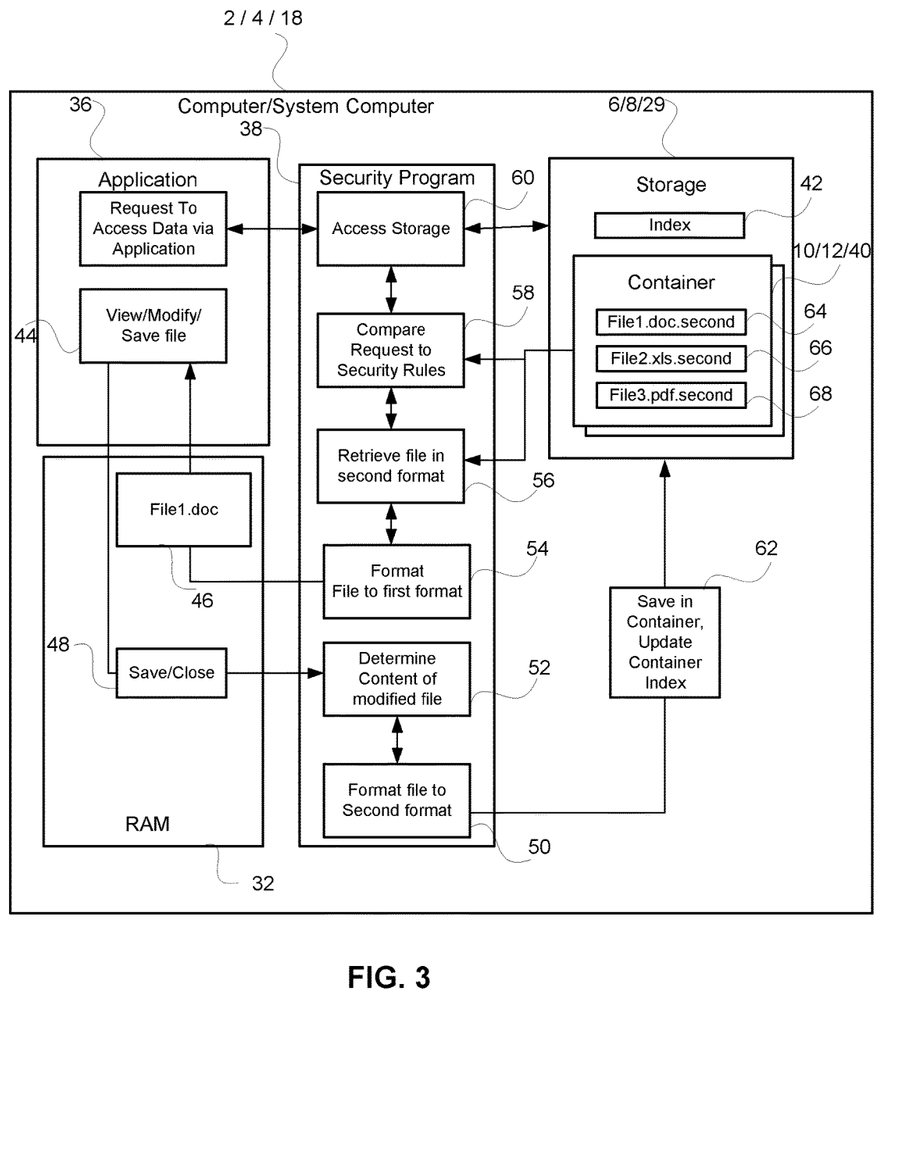
FIG. 3 is another functional block diagram showing more detail of how access to the local data on the computers of FIG. 1 is controlled.

In FIG. 3, an exemplary process of accessing data in a secure manner is shown with regards to data stored locally on a computer 2/4/18. It is understood that a similar system and process can be applied to cloud or remote stored data. The application 36 requests to access data and the security program 38 accesses the storage 6/8/29. A comparison is made between the request, the file 64/66/68 and the security rules to determine if access is allowed. This may be based on where the request originates, who made the request, the content of the file, various tags associated with the file, source, destination or URL address associated with the file, what type of device is requesting access and its relative security and others. These are examples only and are not limiting.

In some cases, the comparison looks at header or metadata 140 of the associated file to determine the content of the data that is associated with the security rules. In other cases, the container 10/12/40 that is associated with the file indicates the content associated with the security rules. Assuming the request is allowed, the file is retrieved in the second format. As can be seen, the first file 64 is called "File1.doc.second" where the ".doc" portion denotes the original format of the document (or the application compatibility) and the ".second" denotes that the file is in a restricted, secure or encrypted format such that the data 142 cannot be read, viewed or written without re-formatting into original format. Thus, when the file is retrieved 56, the security program 38 re-formats the data to the first format (.doc in this example) so that the application (Microsoft word in this case) can open, view, read and/or write the file. When formatting the file to the first format 54, the security application may access the index 42 to determine what the appropriate format is for the particular file. Accessing the index may be necessary if the file is stored as "File1.second."

The file in the first format 46 may be made accessible from Random Access Memory (RAM) so that the application 36 may access the file in a readable format for viewing/modification 44 by the user/application.

When the file is then saved or closed, the content of the file is determined 52, for example based on keywords. The keyword may be associated with, author(s), project titles and other identifiers that allow the system to determine a security rule that applies to the data based on content. are searched within the document so that the file can be saved in the storage 6/8/29 and associated with the appropriate container. The file is formatted into the second format 50 and then written to the storage. In addition to saving in the container, the index may be updated 62 to map storage locations to file formats. In some cases, the index may associate a particular key code or encryption code with different files and the index may only be accessible once the request is verified to comply with security rules. At this point, the encryption/key code would be sent to the security program to allow for the file 64/66/68 etc to be formatted for access. Updating the index after saving and closing may also include updating the encryption/key code associated with the particular file so that the encryption/key code is different each time the data is accessed from the storage.

The analysis can be completed each time data is saved in the storage, however, when the file is saved but not closed, the formatted application compatible file 46 can still be accessible to the application. Once the file is closed in the application, the underlying data is no longer accessible from memory until the process of comparing security rules and the re-formatting is completed again.

In some cases, some or all of data in the storage 6/8/29 is not initially stored in the second format such that the application may access the data directly without use of the security program. This may be primarily prevalent on new computers or computers having the software/systems described herein newly installed where data records in the first format are already existing. In this example, the security program monitors saving/closing operations and I/O requests or requests to write data to the storage to determine when particular data should be formatted into the second format for security purposes. The save/close 48 operation may be performed by the application 38 and the security program 38 would intercept the request and determine the content 52. For example based on keyword(s), user identifiers or device identifiers associated with the file that allow the system to determine the content of the file and the sensitivity thereof based on security rules.

The security application may also be configured to restrict certain user interface or other functions that may carry security risks. As an example, copy/paste functions and the ability to take screenshots may allow a user to transfer data out of the secure environment described herein. For example, if the user opens a customer list file through the security application (with a verified request), the user may wish to copy the customer list and e-mail it. In order to do this, the user could use the screen shot function and then transmit the screenshot via email. The security application may detect the application window where sensitive data is displayed for editing and when a screen shot application attempts to capture the sensitive data, the security application may redact or black out the application window within the screen shot. As another example, if the user attempts to copy and paste content of one document into another, the security application may restrict these functions between applications that are controlled by the security application. For example, if a user attempts to move something in Word to Excel and the Word and Excel files will both be saved by the security application (in the second format), this would be allowed. However, if the user attempts to copy part of the word file into an email, this may be allowed only for specific recipients or may be prevented all together. Where the email is allowed for specific recipients, the email may be converted to the second format before sending such that a security application on the other end will be able to re-format the email message to the first format for reading/opening/display.

Figure 4:
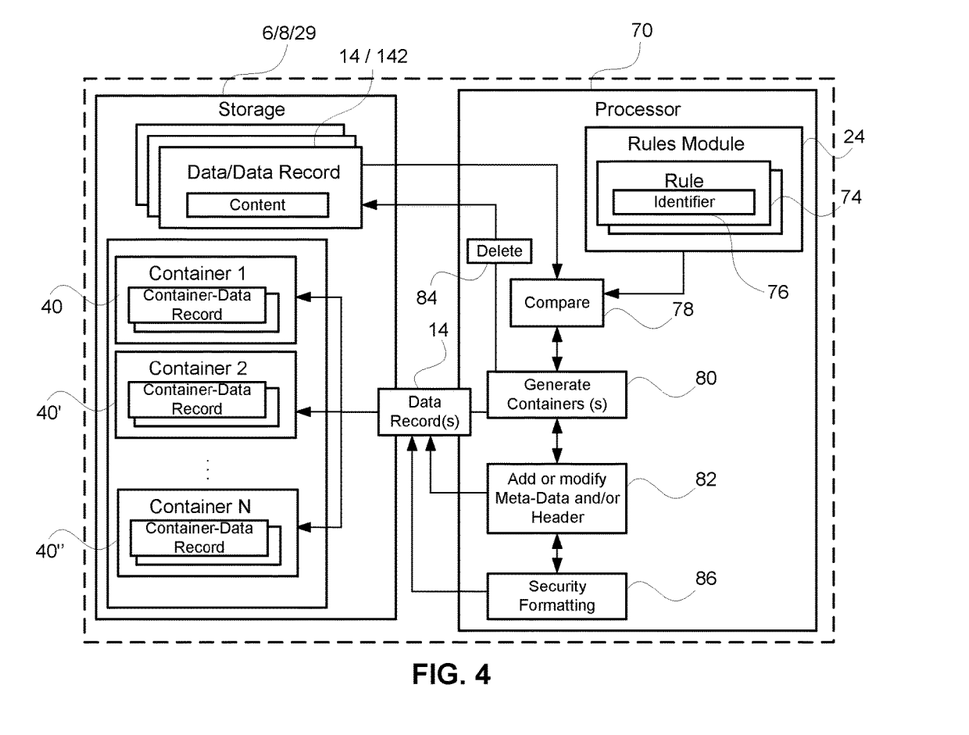
FIG. 4 is a functional block diagram showing how data records are placed in data containers of FIGS. 1-3.

FIG. 4 shows how data or data records 14/142 already existing in storage are containerized and/or tagged based on security rules. The storage 6/8/29 contains data and/or data records 14/142 which have content. A rules module 24 has a number of rules 74 that are associated with various identifiers 76. These identifiers 76 may be keywords, user identifiers, and/or device identifiers. In some examples source address, destination address, URL, or other indications of the content and/or sensitivity of the data records may be used. The content of the data/data records 14/142 are compared 78 to the identifier 76 to determine the appropriate container. The containers are generated 80 and the associated data records 14/142 are sent to the containerized section of the storage. Part of the container generation process 80 may include adding or modifying meta-data and/or a header 82 such that the meta-data/header include information that can be used in application of the security rules 74 to determine the identifier 76. In addition, the data/data record 14/142 can be formatted 86 for use with the security program 38 as has been previously discussed. Now, the data/data records are containerized and container-data records 40, 40' and 40" are associated with the containers. Optionally the original data/data records that are not containerized can be deleted 84 or access to these records can be removed. It is also understood that a container index may be generated in this process that maps the location of previous data/data records 14/142 to a container-data record 40, 40' 40" so that applications (or the security program) can retrieve the container-data record that matches the previous data/data record. It is understood that the processes described herein with regards to data/data records/files can also be applied to the container-data records in a similar manner.

The user identifiers may simply be the author/originator or editor of a particular file, but the user identifier may further be information associated with a particular user or groups of users such as a title, group, position, associated projects or other similar human resources information. This information may be obtained from a Human Resource Information System (HRIS) associated with the enterprise. The title of the user may indicate initially indicate to the system that a particular individual is more likely to have access to sensitive information. For example, the general counsel may have access to highly sensitive quarterly earnings reports before they are released to the public (for publicly traded entities). In addition, the assistant for the general counsel may have access to this sensitive information by virtue of their close working relationship with the general counsel. If the assistant forwards or otherwise sends information to another employee, the system may use keyword recognition to determine if the information is sensitive and if the other employee should be allowed access to such information. Since the other employee. In this example, if the information sent was a word version draft of the quarterly report, the security program will have tagged the word file with particular keyword tags and security rules. Therefore, when the other employee who was forwarded the quarterly report attempts to open the document, the security program would decline the request and not format the file from the second format to the first format.

The device identifier may indicate what device was used in the creation of the record and may further be indicative of which device is requesting access to the data record. The type of the device may also be indicated as well as the location thereof. For example, a desktop computer installed in a user's office at work may be permitted to access more data than the same user's remote computer that is connected through a VPN. There may also be restrictions on transmission of data records in the second format to certain devices such as the user's remote computer.

Keywords (which may single words or may be phrases or keyword based search logic) are used to identify sensitivity of certain data records. A specific project title or even "first quarter financials" in a document or document title may indicate increased sensitivity. For example, "first quarter financials" of a publicly traded company may be confidential until earnings are released according to SEC rules and regulations. Distribution of the financials outside the company or distribution to individuals who have no reason to need to know what the financials are could result in problems for the enterprise.

The source identifier in some embodiments may indicate where the file was originally or previously stored on. In a networked system, the "Z" drive may be considered the location where the most sensitive information is stored. The destination identifier may indicate that a particular user is requesting to open a "Z" drive file on their personal computer in a location outside the office. The security rules may restrict such operations so that the user is able to open the file on a non-personal computer and other access is restricted.

Figure 5:
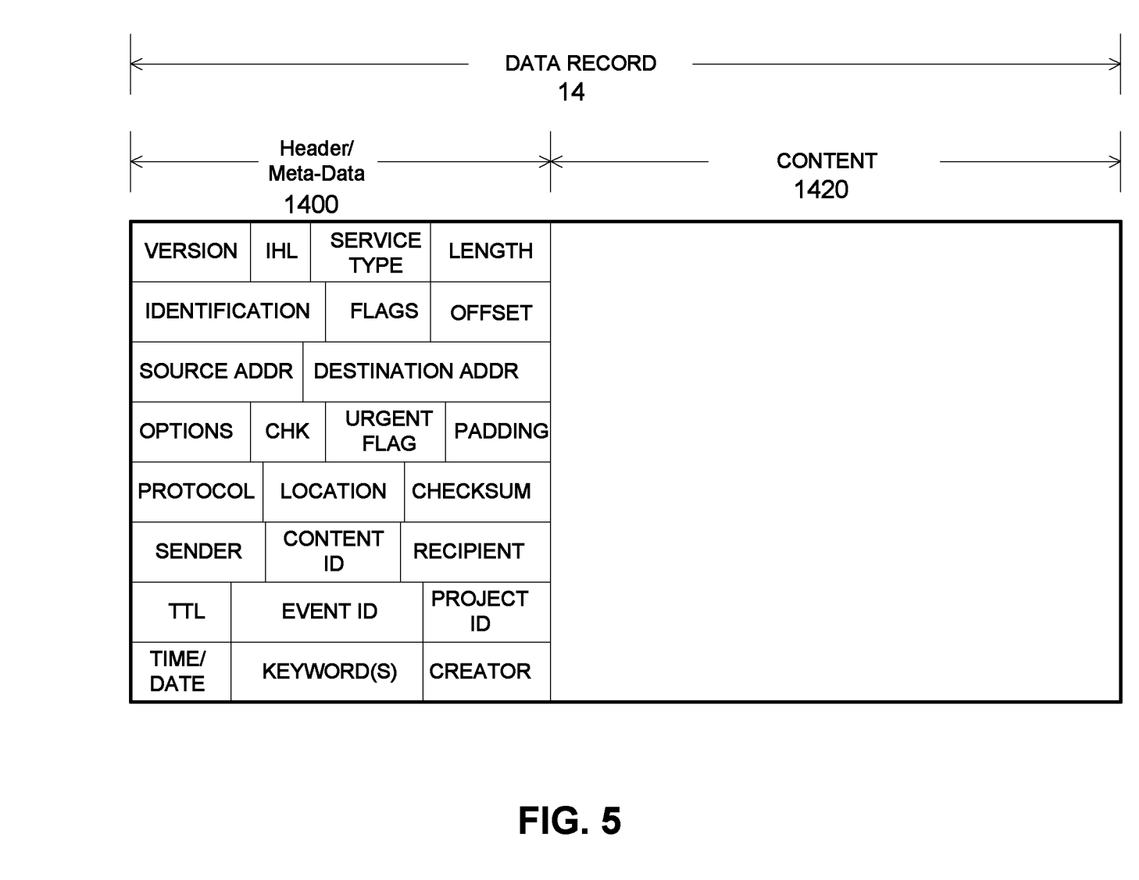
FIG. 5 is a diagram of a data record according to FIGS. 1-4.

FIG. 5 shows more detail concerning some exemplary header/meta-data 1400 content that is associated with data 1420 in the data record 14. It is understood that the system could also associate the header/meta-data 1400 with data in the first format. As one example, the Project ID could be used to restrict data access to individuals associated with the project and those with access. The containerization system shown in FIG. 4 could write the Project ID onto the data record when the containers are generated. This writing of the Project ID could be done based on a keyword search of the content of the data. In other cases, the author and storage locations could indicate a Project ID. In order to determine the identifiers in the header/meta-data 140, the system could use a scoring system that determines the highest likelihood of relationship to a known Project ID. For example, it is contemplated that keywords could not be present in the data content, but the original author, editors, storage location and other information in the data could match other known criteria about the project associated with the Project ID. Therefore, even though the keywords do not match the Project ID, the Project ID could still be determined if it is the most likely Project ID based on other criteria of the data.

The containerization process may simply add header/meta-data 1400 to the data record 14 and the security rules may be applied during transmission of data in the first format.

One example of restriction of data based on Project ID is an example of communications outside the company, for example with clients. In the example of attorney-client communications, the attorney may be sending correspondence to a client via e-mail. The Project ID may be the client identifier and/or a specific matter identifier. The Project ID would then be associated with specific contacts or possibly specific e-mail domains that are associated with the client. Thus, if the attorney happened to mis-type the name of the recipient, the system would compare the Project ID to the proposed recipient and determine that the proposed recipient is not allowed to receive communications concerning the specific Project ID and would thus reject the request to transmit the correspondence.

In another example, the Sender field of the header/meta-data 140 could be used to restrict forwarding. For example, a rule may restrict communications received from a particular person or group of people from being sent to another person or another group of people.

The system may also be configured to recognize data that is confidential under a non-disclosure agreement (NDA). For example, certain recipients may be associated with a particular NDA such that communications from the individual associated with the NDA are restricted according to rules based on the provisions of the NDA. Other confidentiality obligations may also be tracked, for example obligations under protective or other court orders may prevent disclosure of certain information, which would impact the security rules applied and the access allowed.

The security program may also be configured to restrict certain user interface functions when files are accessible in the first format. For example, copy/paste and screen shot functions may only be allowed when transferring or copying information into a secure file whose disk operations are intercepted by the security program. Thus, if a messaging program is not controlled by the security program, the security program would prevent the user from copying text in a sensitive document into the messaging program and then sending it to another user. The same may hold true for screen shots and other user interface functions that could allow for copying of data.

The system can also keep logs of data access to determine who accessed data, when, how long and where the data was sent.

It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions or combinations of functions described herein.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for formatting data records based on security rules, the system comprising:
a computer and a storage accessible by said computer, the storage having a plurality of data records stored thereon in a first format, the first format associated with an application, wherein each of the plurality of data records is a file such that the file is formatted in the first format;
a security application executing on said computer and intercepting disk input and output (I/O) operations between said computer and said storage;
said security application identifying a content of a data record of said plurality of data records based on a content identifier associated with one or more of: a keyword, a user identifier and a device identifier;
said security application tagging said data record with a tag based on the content identifier and a security rule, the security rule indicative of permissions or restrictions or combinations thereof associated with access to the data record based on the content identifier;
wherein said data record includes at least two sections, a first section contains the tag and a second section contains the content of the data record, said security application converting the second section of the data record to a second format wherein when in the second format, the second section is not accessible by the application, such that the data record in the second format is the content thereof in the second format in its entirety;

the data record is stored on said storage in the second format such that when said security application intercepts a disk operation to access the data record via the application, said security application compares the tag to the security rule and converts the data record to the first format if the disk operation complies with the security rule based on the tag, such that the data record is accessible as the file formatted in the first format;

wherein the tag is accessible from the first section of said data record when said second section is in the second format.

2. The system of claim 1 wherein the security application prevents transmission of the data record over a network based on the tag and the security rule.

3. The system of claim 1 wherein when the disk operation complies with the security rule and the second section of the data record is converted to the first format, the second section of the data record is available in the first format from a Random Access Memory of said computer.

4. The system of claim 1 wherein the first format is compatible with a format selected from the group consisting of: .doc, .docx, .pdf, .jpg, .jpeg, .tiff, and .png.

5. The system of claim 1 wherein the second format is an encryption.

6. The system of claim 1 wherein the security rule is further associated with at least one user such that the permission, restriction or combination thereof applies to the at least one user.

7. The system of claim 1 wherein the permission or restriction is based on a keyword associated with the data record.

8. A system for converting data to a first format for secure access to the data comprising:

a computer and a storage accessible by said computer, the storage having a plurality of data records stored thereon in a first format, the first format associated with an application, wherein each of the plurality of data records including at least two sections, a first section of a data record of said plurality of data records containing a tag associated with a content identifier and a security rule and a second section of the data record containing a content of the data record, wherein the security rule indicative of permissions or restrictions or combinations thereof associated with access to the data record based on the content identifier;

a security application executing on said computer and intercepting disk input and output (I/O) operations between said computer and said storage;

said security application converting the second section of the data record to a second format wherein when in the second format, the second section is not accessible by the application, such that the data record in the second format is the content thereof in the second format in its entirety;

said security application intercepting a disk operation to access the data record via the application;

said security application comprising the tag to a security rule and further converting the second section of the data record to the first format if the disk operation complies with the security rule based on the tag such that the data record is accessible as the file formatted in the first format;

wherein the tag is accessible from the first section of said data record when the second section of said data record is in the second format.

9. The system of claim 8 wherein the data record is accessible in the first format from a Random Access Memory of said computer.

10. The system of claim 8 wherein the first format is selected from the group consisting of: .doc, .docx, .pdf, .jpg, .jpeg, .tiff, and .png.

11. The system of claim 8 wherein the second format is an encryption.

12. The system of claim 8 wherein the security rule is associated with at least one user such that a permission, restriction or combination thereof applies to the at least one user.

13. The system of claim 8 wherein tag is indicative of a keyword, a user identifier, a device identifier or combinations thereof of the second section of the data record.

14. The system of claim 8 further comprising:

said security application intercepting a second disk operation to save the data record and said security application identifying the content of the data record based on one or more of: a keyword, a user identifier and a device identifier;

said security application tagging said data record with a second tag based on the identification of the content and based on a security rule, the security rule indicative of permissions or restrictions or combinations thereof associated with access to the data record based on the content;

said security application converting the data record to the second format.

15. The system of claim 14 wherein when the data record is accessible in the first format via the application, user interface functions which allow capture or copying of at least part of the data record are restricted from access to the data record.

* * * * *